United States Patent
Kim (10) Patent No.: US 12,246,709 B2
(45) Date of Patent: Mar. 11, 2025

(54) LANE KEEPING APPARATUS AND METHOD THEREOF

(71) Applicants: HYUNDAI MOTOR COMPANY, Seoul (KR); KIA CORPORATION, Seoul (KR)

(72) Inventor: Seung Hyun Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 322 days.

(21) Appl. No.: 17/711,274

(22) Filed: Apr. 1, 2022

(65) Prior Publication Data
US 2023/0117002 A1  Apr. 20, 2023

(30) Foreign Application Priority Data
Oct. 19, 2021 (KR) .......................... 10-2021-0139609

(51) Int. Cl.
*B60W 30/12* (2020.01)
*B60W 50/00* (2006.01)

(52) U.S. Cl.
CPC ............ *B60W 30/12* (2013.01); *B60W 50/00* (2013.01); *B60W 2050/0056* (2013.01); *B60W 2510/20* (2013.01); *B60W 2710/207* (2013.01)

(58) Field of Classification Search
CPC ...... B60W 30/12; B60W 30/04; B60W 50/00; B60W 2050/0056; B60W 2510/20; B60W 2554/4046; B60W 2554/80; B60W 2556/10; B60W 2710/207

USPC .......................................................... 701/26
See application file for complete search history.

(56) References Cited

U.S. PATENT DOCUMENTS

| | | | |
|---|---|---|---|
| 8,190,330 B2 * | 5/2012 | Lee .......................... | B62D 1/28 |
| | | | 701/44 |
| 8,548,683 B2 | 10/2013 | Cebon et al. | |
| 9,014,919 B2 * | 4/2015 | Kim .................... | B62D 15/0255 |
| | | | 180/170 |
| 9,469,343 B2 | 10/2016 | Kim | |
| 9,616,924 B2 | 4/2017 | Spero et al. | |
| 9,643,650 B2 * | 5/2017 | Sim ..................... | B60K 31/0008 |
| 9,849,911 B2 * | 12/2017 | Lee ........................ | B62D 13/00 |
| 10,077,072 B2 * | 9/2018 | Hori ...................... | B62D 5/0463 |
| 10,870,448 B2 * | 12/2020 | Kunihiro .............. | B62D 15/025 |
| 11,364,929 B2 * | 6/2022 | Zaseck .............. | B60W 30/0953 |
| 11,433,889 B2 * | 9/2022 | Sato ................ | B60W 60/00182 |

(Continued)

FOREIGN PATENT DOCUMENTS

| | | |
|---|---|---|
| EP | 2173599 B1 | 10/2011 |
| JP | 6642772 B2 | 2/2020 |

(Continued)

*Primary Examiner* — Andrew Joseph Rudy
(74) *Attorney, Agent, or Firm* — MCDONNELL BOEHNEN HULBERT & BERGHOFF LLP (57) ABSTRACT

The prevent disclosure relates to a lane keeping control apparatus and a method thereof. An exemplary embodiment provides a lane keeping control apparatus including a processor configured to calculate a steering angle control amount for following a target path for lane keeping control while driving a vehicle, and to adjust the steering angle control amount depending on a change directionality of a target path error that is an error between the target path and the vehicle, and a storage configured to store data and algorithms driven by the processor.

19 Claims, 5 Drawing Sheets

(56) References Cited

U.S. PATENT DOCUMENTS

| | | | |
|---|---|---|---|
| 11,938,999 B2* | 3/2024 | Kim | B62D 15/025 |
| 11,939,015 B2* | 3/2024 | Takeuchi | B60W 30/12 |
| 2011/0202238 A1 | 8/2011 | Cebon et al. | |
| 2014/0218508 A1 | 8/2014 | Kim | |
| 2016/0057921 A1* | 3/2016 | Pickett | A01B 69/008 |
| | | | 701/41 |
| 2022/0324421 A1* | 10/2022 | Giovanardi | B60W 40/06 |
| 2023/0131835 A1* | 4/2023 | Hwang | B60W 60/001 |
| | | | 701/22 |

FOREIGN PATENT DOCUMENTS

| | | | | |
|---|---|---|---|---|
| KR | 2014-0075218 A | 6/2014 | | |
| KR | 2014-0100787 A | 8/2014 | | |
| WO | WO-2021050561 A2 * | 3/2021 | | A01B 69/008 |

* cited by examiner

LANE KEEPING APPARATUS AND METHOD THEREOF

CROSS REFERENCE TO RELATED APPLICATIONS

This application claims priority to and benefits of Korean Patent Application No. 10-2021-0139609, filed in the Korean Intellectual Property Office on Oct. 19, 2021, the entire contents of which are incorporated herein by reference.

BACKGROUND

(a) Field

The present disclosure relates to a lane keeping control apparatus and a method thereof, and more particularly, to a technique for preventing over-steering control during lane keeping control.

(b) Description of the Related Art

A lane keeping assist system (LKAS), which is a lateral-direction safety control system of a vehicle, uses information from a camera sensor to recognize a lane based on image processing of an image in front of the vehicle.

A conventional LFA calculates an error from a gaze distance to a target path through the camera sensor, and then feeds it back to perform control. However, since this method does not reflect a path error characteristic and performs control by using only a current error value, excessive control is often involved unnecessarily, resulting in repetitive oscillations in the form of oversteer or understeer in a curve.

The above information disclosed in this Background section is only for enhancement of understanding of the background of the disclosure, and therefore, it may contain information that does not form the prior art that is already known in this country to a person of ordinary skill in the art.

SUMMARY

An exemplary embodiment of the present disclosure has been made in an effort to provide a lane keeping control apparatus and a method thereof, capable of preventing over-steering intervention to prevent oscillation of the vehicle, thus maintaining a smooth steering feel by performing steering angle control in consideration of not only a path error but also directionality of the path error depending on road curvature.

The technical objects of the present disclosure are not limited to the objects mentioned above, and other technical objects not mentioned can be clearly understood by those skilled in the art from the description of the claims.

An exemplary embodiment of the present disclosure provides a lane keeping control apparatus including a processor configured to calculate a steering angle control amount for following a target path for lane keeping control while driving a vehicle, and to adjust the steering angle control amount depending on a change directionality of a target path error that is an error between the target path and the vehicle, and a storage configured to store data and algorithms driven by the processor.

In an exemplary embodiment, the processor may calculate an error slope by using a forward gaze distance of the vehicle and the target path error.

In an exemplary embodiment, the processor may determine the change directionality of the target path error depending on a product of signs of the error slope and the target path error.

In an exemplary embodiment, the processor may determine that the target path error decreases when a product of signs of the error slope and the target path error is negative.

In an exemplary embodiment, the processor may determine that the target path error increases when a product of signs of the error slope and the target path error is positive.

In an exemplary embodiment, the processor may decrease the steering angle control amount when the change directionality of the target path error decreases.

In an exemplary embodiment, the processor may decrease the steering angle control amount by using a low-pass filter.

In an exemplary embodiment, the processor may decrease the steering angle control amount by using a steering angle control amount table depending on road curvature.

In an exemplary embodiment, the processor may maintain the steering angle control amount when the change directionality of the target path error increases.

An exemplary embodiment of the present disclosure provides a lane keeping control method including calculating a steering angle control amount for following a target path for lane keeping control while driving a vehicle, determining a change directionality of a target path error that is an error between the target path and the vehicle, and adjusting the steering angle control amount depending on the change directionality of the target path error.

In an exemplary embodiment, the calculating of the steering angle control amount may include calculating the steering angle control amount by using the target path error such that the vehicle follows the target path.

In an exemplary embodiment, the determining the change directionality of the target path error may include calculating an error slope by using a forward gaze distance of the vehicle and the target path error.

In an exemplary embodiment, the determining the change directionality of the target path error may further include determining the change directionality of the target path error depending on a product of signs of the error slope and the target path error.

In an exemplary embodiment, the determining the change directionality of the target path error may further include determining that the target path error decreases when a product of signs of the error slope and the target path error is negative.

In an exemplary embodiment, the determining the change directionality of the target path error may further include determining that the target path error increases when a product of signs of the error slope and the target path error is positive.

In an exemplary embodiment, the adjusting of the steering angle control amount may include decreasing the steering angle control amount when the change directionality of the target path error decreases.

In an exemplary embodiment, the decreasing of the steering angle control amount may include decreasing the steering angle control amount by using a low-pass filter.

In an exemplary embodiment, the decreasing of the steering angle control amount may include decreases the steering angle control amount by using a steering angle control amount table depending on road curvature.

In an exemplary embodiment, the adjusting of the steering angle control amount may include maintaining the steering angle control amount when the change directionality of the target path error increases.

According to the present technique, over-steering intervention may be prevented to prevent oscillation of the vehicle, thereby maintaining a smooth steering feel by performing steering angle control in consideration of not only a path error but also directionality of the path error depending on road curvature.

In addition, various effects that can be directly or indirectly identified through this document may be provided.

DETAILED DESCRIPTION

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 1 to FIG. 5.

Figure 1:
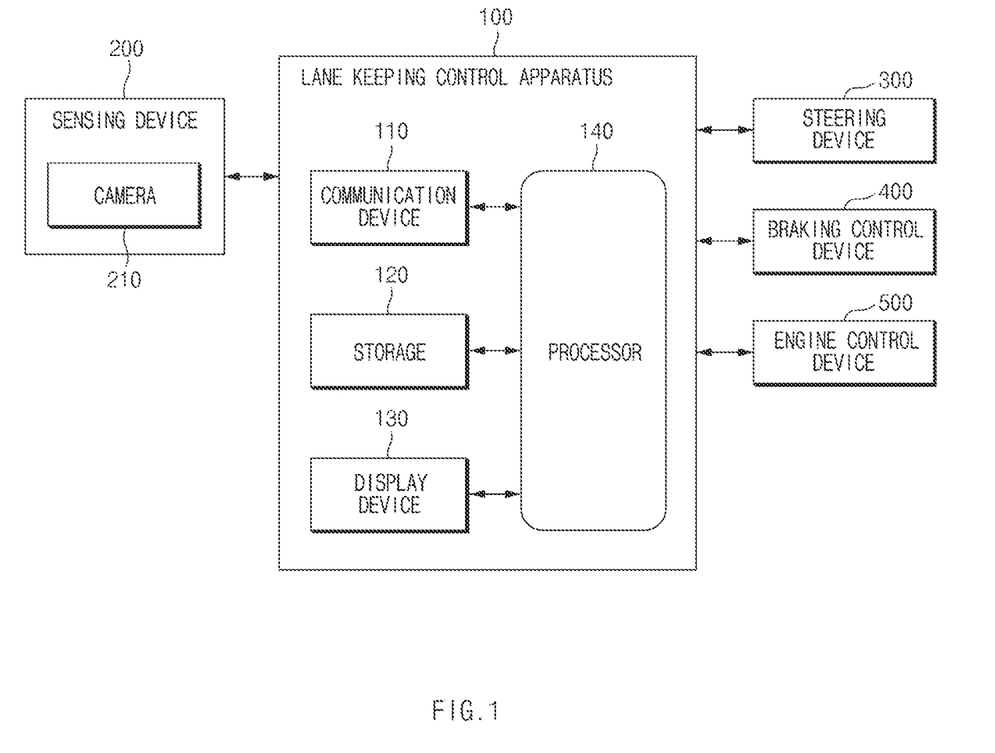
FIG. 1 illustrates a block diagram showing a configuration of a vehicle system including a lane keeping control apparatus according to an exemplary embodiment of the present disclosure.

FIG. 1 illustrates a block diagram showing a configuration of a vehicle system including a lane keeping control apparatus according to an exemplary embodiment of the present disclosure.

Referring to FIG. 1, the vehicle system according to the exemplary embodiment of the present disclosure may include a lane keeping control apparatus 100, a sensing device 200, a steering control device 300, a braking control device 400, and an engine control device 500.

The lane keeping control apparatus 100 according to the exemplary embodiment of the present disclosure may be implemented inside the vehicle. In this case, the lane keeping control apparatus 100 may be integrally formed with internal control units of the vehicle, or may be implemented as a separate device to be connected to control units of the vehicle by a separate connection means.

The lane keeping control apparatus 100 may include a lane departure warning (LDW), a lane keeping system (LKS), and a lane keeping assistance system (LKAS), etc.

The lane keeping control apparatus 100 may calculate a steering angle control amount for following a target path for lane keeping control while driving the vehicle. In this case, the lane keeping control apparatus 100 may adjust (increase or maintain) the steering angle control amount depending on a change directionality of the target path error, which is an error between the target path and the vehicle.

Referring to FIG. 1, the lane keeping control apparatus 100 may include a communication device 110, a storage 120, an interface device 130, and a processor 140.

The communication device 110 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, Ethernet communication, and the like.

In addition, the communication device 110 may perform communication by using a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like. For example, the communication device 110 may receive gaze distance information from a camera 210.

The storage 120 may store sensing results of the sensing device 200 and data and/or algorithms required for the processor 140 to operate, and the like.

As an example, the storage 120 may store a gaze distance, a steering angle control increase/decrease rate table matched depending on a path error directionality according to road curvature, a cut-off frequency of a low-pass filter, and the like.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 100 and results thereof. Herein, the input means may include a key button, and may further include a mouse, a joystick, a jog shuttle, a stylus pen, and the like. In addition, the input means may further include a soft key implemented on the display.

The interface device 130 may be implemented as a head-up display (HUD), a cluster, an audio video navigation (AVN), a human machine interface (HM), a user setting menu (USM), or the like.

The output means may include a display, and may further include a voice output means such as a speaker. In this case, when a touch sensor formed of a touch film, a touch sheet, or a touch pad is provided on the display, the display may operate as a touch screen, and may be implemented in a form in which an input device and an output device are integrated. For example, the interface device 130 may display a lane keeping control situation on a screen such that a user can check it.

In this case, the display may include at least one of a liquid crystal display (LCD), a thin film transistor liquid crystal display (TFT LCD), an organic light emitting diode display (OLED display), a flexible display, a field emission display (FED), or a 3D display.

The processor 140 may be electrically connected to the communication device 110, the storage 120, the interface device 130, and the like, may electrically control each component, and may be an electrical circuit that executes software commands, thereby performing various data processing and calculations described below.

The processor 140 may process a signal transferred between components of the lane keeping control apparatus 100, and may perform overall control such that each of the components can perform its function normally.

The processor 140 may be implemented in the form of hardware, software, or a combination of hardware and software, or may be implemented as microprocessor, and may be, e.g., an electronic control unit (ECU), a micro controller unit (MCU), or other subcontrollers mounted in the vehicle.

The processor 140 may calculate a steering angle control amount for following a target path for lane keeping control while driving the vehicle, and in this case, may adjust the steering angle control amount depending on a change directionality of a target path error that is an error between the target path and the vehicle.

Figure 2:
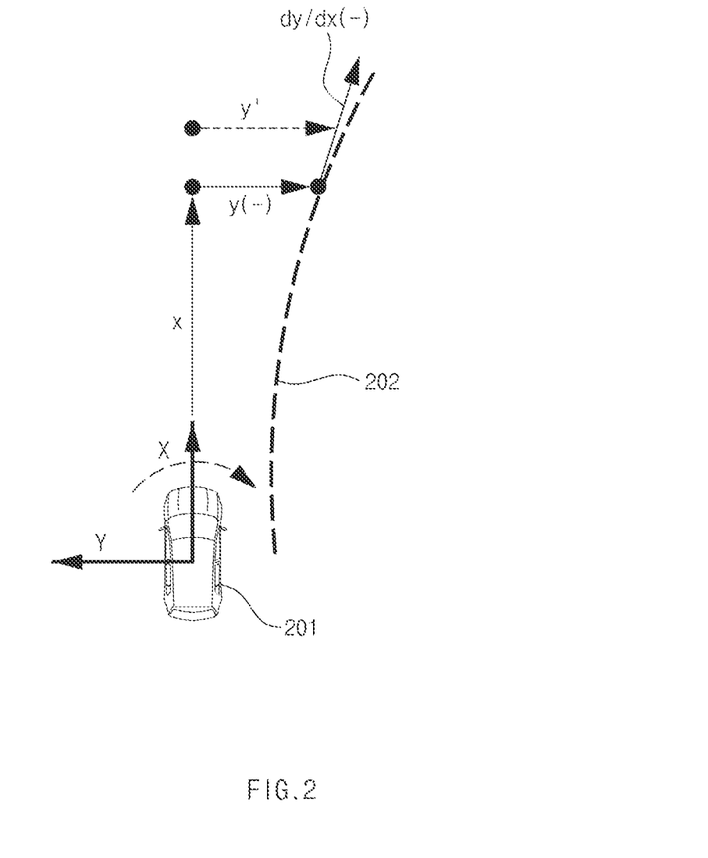
FIG. 2 illustrates an example of a screen when a steering angle speed of the lane keeping control apparatus is not limited according to an exemplary embodiment of the present disclosure.
Figure 3:
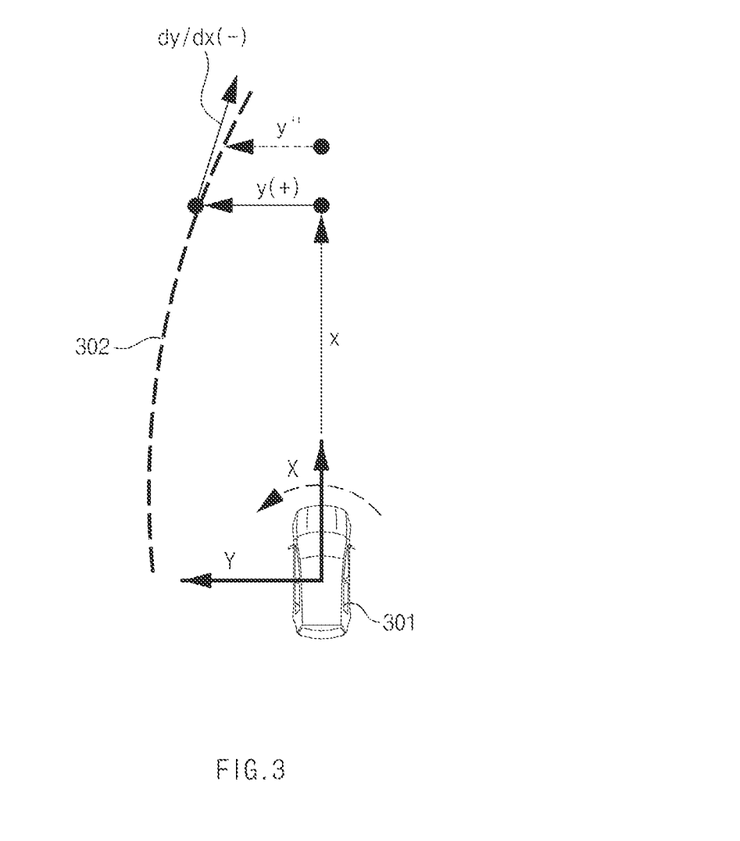
FIG. 3 illustrates an example of a screen when a steering angle speed of the lane keeping control apparatus is limited according to an exemplary embodiment of the present disclosure.

First, the processor 140 may calculate an error slope (dy/dx) by using a forward gaze distance x of the vehicle and the target path error y. In this case, as illustrated in FIG. 2, the forward gaze distance x may be obtained through the camera 210 as a distance from which the vehicle gazes forward. The target path error y is a distance error between the vehicle and the target path, and may be obtained from the camera 210. In this case, FIG. 2 illustrates an example of a screen when a steering angle speed of the lane keeping control apparatus is not limited according to an exemplary embodiment of the present disclosure, and FIG. 3 illustrates an example of a screen when a steering angle speed of the lane keeping control apparatus is limited according to an exemplary embodiment of the present disclosure.

The processor 140 may determine the change directionality of the target path error depending on a product of signs of the error slope dy/dx and the target path error y. That is, the sign of the error slope refers to the directionality of the slope, and when the error slope is inclined to right, it has a negative sign, and when the error slope is inclined to left, it has a positive sign. In FIG. 2 and FIG. 3, a case in which the error slope has the negative sign will be described as an example.

When the product of the signs of the error slope and the target path error has a negative number, the processor 140 may determine that the target path error decreases because a driving direction of the vehicle approaches the target path.

On the other hand, when the product of the signs of the error slope and the target path error is positive or 0, the processor 140 may determine a direction in which the target path error increases.

That is, when the sign of the error slope is negative and the sign of the target path error is positive as illustrated in FIG. 3, the product of the error slope and the sign of the target path error becomes negative. As illustrated in FIG. 2, when the sign of the error slope is negative and the sign of the target path error is negative, the product of the signs of the error slope and the target path error becomes positive.

The processor 140 may decrease the steering angle control amount when the change directionality of the target path error decreases, that is, when the target path error decreases. That is, since an error between the driving direction of the vehicle and the target path decreases in a direction in which the target path error decreases as the vehicle travels, the processor 140 may decrease and apply the steering angle control amount calculated at the current position to prevent over-steering.

In this case, the processor 140 may decrease the steering angle control amount by using a low-pass filter, or may decrease the steering angle control amount by using a steering angle control amount table depending on road curvature. That is, the processor 140 may decrease the steering angle control amount by presetting a cutoff frequency that is a tuning parameter of the low-pass filter. In addition, the processor 140 may store a table in which the steering angle control amount is mapped depending on the road curvature by experimental values in advance in the storage 120, and when the steering angle control amount is decreased, a decreasing amount thereof may be determined by using the table.

When the change directionality of the target path error is in an increasing direction, that is, in a direction in which the target path error is increasing, the processor 140 may maintain the steering angle control amount that is calculated by using the target path error as it is and may apply it to the steering control.

The sensing device 200 may include a camera 210 and the like. The camera 210 may photograph a front of a host vehicle to provide information such as a gaze distance and a target path error to the vehicle maintenance control apparatus 100.

The steering control device 300 may be configured to control a steering angle of a vehicle, and may include a steering wheel, an actuator interlocked with the steering wheel, and a controller controlling the actuator.

The braking control device 400 may be configured to control braking of the vehicle, and may include a controller that controls a brake thereof.

The engine control device 500 may be configured to control engine driving of a vehicle, and may include a controller that controls a speed of the vehicle.

As such, the present disclosure uses the pre-mounted camera 210 and the ultrasonic wave sensor 220 to search for the parking space and supports double-lane keeping control when there is no empty parking space.

Next, an example of adjusting the steering angle control amount will be described in detail with reference to FIG. 2 and FIG. 3.

FIG. 2 illustrates an example of a screen when a steering angle speed of the lane keeping control apparatus is not limited according to an exemplary embodiment of the present disclosure, and FIG. 3 illustrates an example of a screen when a steering angle speed of the lane keeping control apparatus is limited according to an exemplary embodiment of the present disclosure.

Referring to FIG. 2, the lane keeping control apparatus 100 controls a vehicle 201 to follow a target path 302 during driving. In this case, the target path 302 may be a center of a target lane.

The lane keeping control apparatus 100 may determine whether over-steering intervention is required by using the target path error y from the gaze distance X received from the camera 210 to the target path 20 and the error slope (dy/dx).

That is, since a value (sin(y)*sin(dy/dx)) obtained by multiplying the sign (−) of the error slope (dy/dx) at the gaze distance x and the sign (−) of the target path error y at the gaze distance x is positive while the vehicle 201 is driving on a curved road, the lane keeping control apparatus 100 determines that the target path error y increases. It can be seen that the target path error increases from y to y'.

When the target path error y increases, the lane keeping control apparatus 100 controls the steering angle based on the steering angle control amount calculated based on the target path error y without limiting the steering angle control amount.

That is, when a target path 302 moves away from a travel direction of the vehicle due to curvature of the target path 302, the target path error y increases, and thus steering angle control is performed by reflecting all calculated steering angle control amounts.

On the other hand, as illustrated in FIG. 3, when the target path 302 approaches a vehicle 301, the target path error y is decreased to y". In this case, when all of the steering angle control amounts calculated at the current point in time of the vehicle 301 is reflected, as an error decreases after driving a certain distance, a steering control direction may need to be reversely controlled, resulting in oscillation of the vehicle.

Accordingly, since a value (Sin(y)*Sin(dy/dx)) obtained by multiplying the sign (−) of the error slope (dy/dx) at the gaze distance x and the sign (+) of the target path error y at the gaze distance x is negative while the vehicle 301 is driving on a curved road, the lane keeping control apparatus 100 determines that the target path error y decreases. It can be seen that the target path error decreases from y to y'.

Accordingly, the lane keeping control apparatus 100 may decrease the steering angle control amount calculated at the current time point of the vehicle 301 by a predetermined amount to apply it.

For example, in the case where the steering angle is 10 in step T1 and the steering angle is 30 in step T2, when moving from step T1 to step T2, the vehicle increases the steering angle by a difference of 20 therebetween. In this case, when the target path error increases as illustrated in FIG. 2, the steering angle is increased by the calculated 20, but in the direction in which the target path error decreases as illustrated in FIG. 3, the steering angle may be increased only by 10 that is smaller than 20 such that a final steering angle is 20.

In this case, when the target path error decreases, a limit of the steering angle control amount may be pre-stored in a table by experimental values depending on road curvature. In addition, a low-pass filter may be used to limit the steering angle control amount, and a cut-off frequency may be preset as a tuning parameter for limiting the steering angle.

Figure 4:
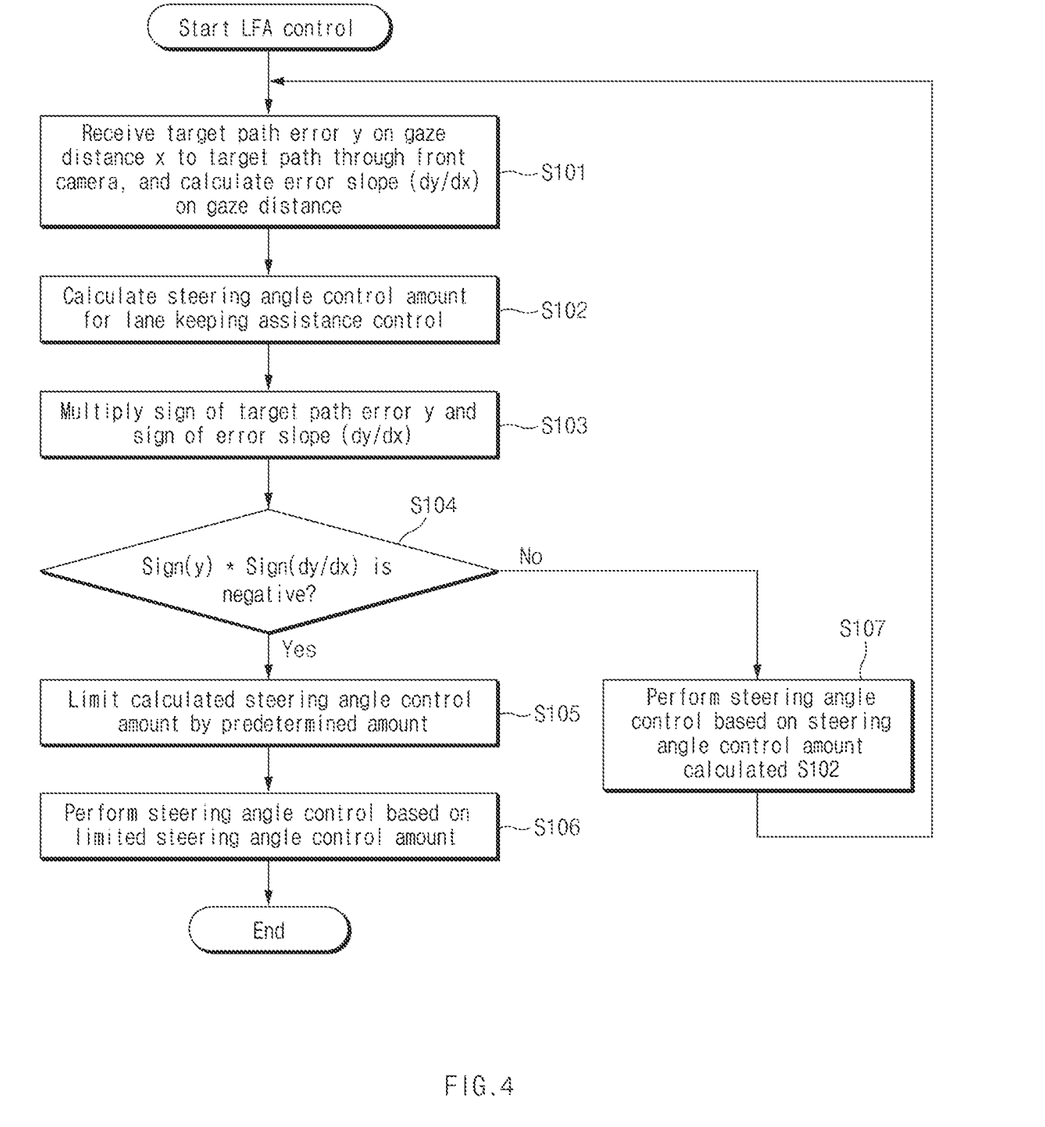
FIG. 4 illustrates a lane keeping control method according to an exemplary embodiment of the present disclosure.

Hereinafter, a lane keeping control method according to an exemplary embodiment of the present disclosure will be described in detail with reference to FIG. 4. FIG. 4 illustrates a lane keeping control method according to an exemplary embodiment of the present disclosure.

Hereinafter, it is assumed that the lane keeping control apparatus 100 of FIG. 1 performs processes of FIG. 4. In addition, in the description of FIG. 4, operations described as being performed by a device may be understood as being controlled by the processor 140 of the lane keeping control apparatus 100.

Referring to FIG. 4, the lane keeping control apparatus 100 receives a target path error y that is an error on the gaze distance x from the front camera 210 to a target path, and calculates an error slope (dy/dx) based on the target path error y and the gaze distance x at S101.

Next, the lane keeping control apparatus 100 calculates a steering angle control amount for lane keeping assistance control at S102. That is, the lane keeping control apparatus 100 may calculate the steering angle control amount for making the target path error, which is a difference between the gaze distance of the vehicle and the target path, to zero (0).

Next, the lane keeping control apparatus 100 multiplies a sign of the target path error y and a sign of the error slope (dy/dx) to determine a change direction (increase or decrease) of the target path error at S103.

The lane keeping control apparatus 100 determines whether a value (Sign(y)*Sign(dy/dx)) obtained by multiplying the sign of the target path error y and the of the error slope (dy/dx) is negative at S104.

When the value obtained by multiplying the sign of the target path error y and the sign of the error slope (dy/dx) is negative, the lane keeping control apparatus 100 decreases the calculated steering angle control amount by a predetermined amount to limit it at S105. That is, the lane keeping control apparatus 100 decreases the steering angle control amount in the direction in which the target path error decreases. Next, the lane keeping control apparatus 100 prevents over-steering control by performing steering angle control based on the limited steering angle control amount at S106.

On the other hand, when the value obtained by multiplying the sign of the target path error y and the sign of the error slope (dy/dx) is positive or 0, the target path error increases, and thus the lane keeping control apparatus 100 performs the steering angle control based on the steering angle control amount calculated in step S102 without decreasing the steering angle control amount at S107.

As such, when the target path error increases, it is possible to follow the target path by receiving the target path error every predetermined period and continuously calculating and applying the steering angle control amount.

As such, according to the present disclosure, when calculating the steering angle control amount for the lane keeping control while the vehicle is driving, it is possible to prevent excessive steering control and minimizes vehicle oscillation by determining the change directionality of the target path error depending on the road curvature and controlling the steering angle control amount depending on the change directionality of the target path error.

Figure 5:
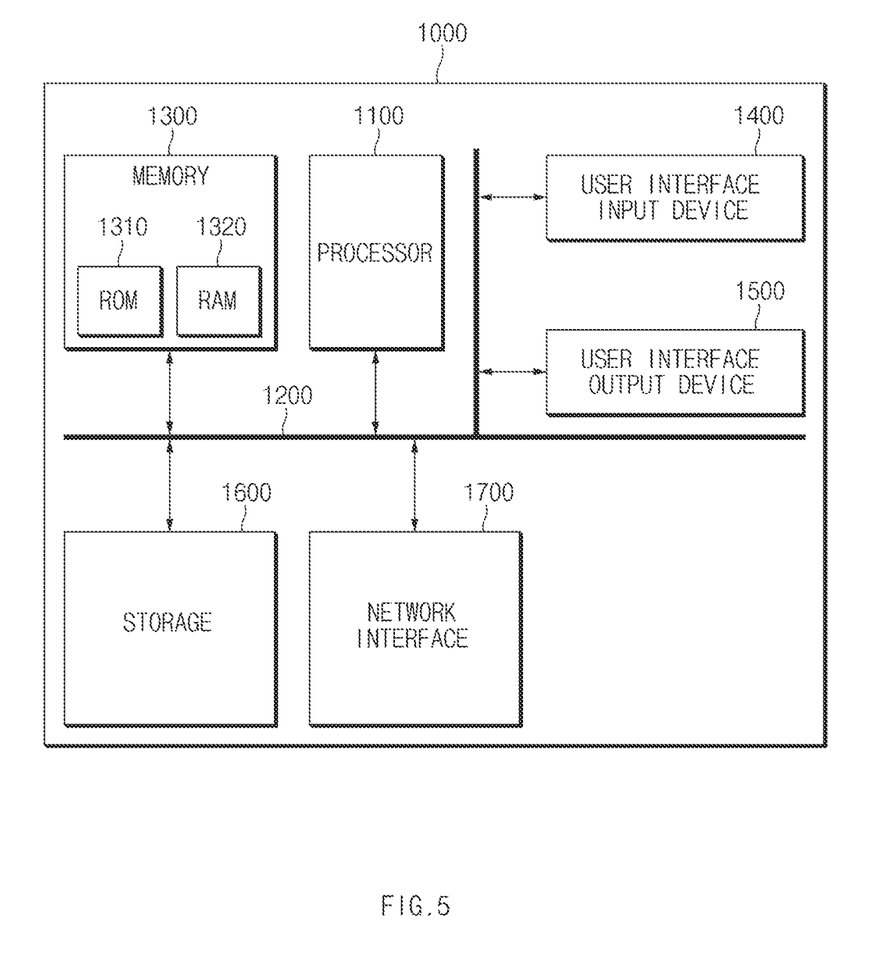
FIG. 5 illustrates a computing system according to an exemplary embodiment of the present disclosure.

FIG. 5 illustrates a computing system according to an exemplary embodiment of the present disclosure.

Referring to FIG. 5, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

The invention claimed is:

1. A lane keeping control apparatus comprising:
   a processor configured to calculate a steering angle control amount for following a target path for lane keeping control while driving a vehicle, and to adjust the steering angle control amount depending on a change directionality of a target path error that is an error between the target path and the vehicle; and
   a storage configured to store data and algorithms driven by the processor.

2. The lane keeping control apparatus of claim 1, wherein the processor calculates an error slope by using a forward gaze distance of the vehicle and the target path error.

3. The lane keeping control apparatus of claim 2, wherein the processor determines the change directionality of the target path error depending on a product of signs of the error slope and the target path error.

4. The lane keeping control apparatus of claim 2, wherein the processor determines that the target path error decreases when a product of signs of the error slope and the target path error is negative.

5. The lane keeping control apparatus of claim 2, wherein the processor determines that the target path error increases when a product of signs of the error slope and the target path error is positive.

6. The lane keeping control apparatus of claim 1, wherein the processor decreases the steering angle control amount when the change directionality of the target path error decreases.

7. The lane keeping control apparatus of claim 6, wherein the processor decreases the steering angle control amount by using a low-pass filter.

8. The lane keeping control apparatus of claim 6, wherein the processor decreases the steering angle control amount by using a steering angle control amount table depending on road curvature.

9. The lane keeping control apparatus of claim 1, wherein the processor maintains the steering angle control amount when the change directionality of the target path error increases.

10. A lane keeping control method comprising:
    calculating, by a processor, a steering angle control amount for following a target path for lane keeping control while driving a vehicle;
    determining a change directionality of a target path error that is an error between the target path and the vehicle; and
    adjusting the steering angle control amount depending on the change directionality of the target path error.

11. The lane keeping control method of claim 10, wherein the calculating of the steering angle control amount includes calculating the steering angle control amount by using the target path error such that the vehicle follows the target path.

12. The lane keeping control method of claim 10, wherein the determining the change directionality of the target path error includes calculating an error slope by using a forward gaze distance of the vehicle and the target path error.

13. The lane keeping control method of claim 12, wherein the determining the change directionality of the target path error further includes determining the change directionality of the target path error depending on a product of signs of the error slope and the target path error.

14. The lane keeping control method of claim 12, wherein the determining the change directionality of the target path error further includes determining that the target path error decreases when a product of signs of the error slope and the target path error is negative.

15. The lane keeping control method of claim 12, wherein the determining the change directionality of the target path error further includes determining that the target path error increases when a product of signs of the error slope and the target path error is positive.

16. The lane keeping control method of claim 10, wherein the adjusting of the steering angle control amount includes decreasing the steering angle control amount when the change directionality of the target path error decreases.

17. The lane keeping control method of claim 16, wherein the decreasing of the steering angle control amount includes decreasing the steering angle control amount by using a low-pass filter.

18. The lane keeping control method of claim 16, wherein the decreasing of the steering angle control amount includes decreasing the steering angle control amount by using a steering angle control amount table depending on road curvature.

19. The lane keeping control method of claim 10, wherein the adjusting of the steering angle control amount includes maintaining the steering angle control amount when the change directionality of the target path error increases.

\* \* \* \* \*